United States Patent [19]

McNaughton et al.

[11] Patent Number: 5,324,080
[45] Date of Patent: Jun. 28, 1994

[54] LOW PRESSURE TUBING QUICK CONNECTOR

[75] Inventors: James McNaughton, Rochester; Donald C. Walker, Pontiac, both of Mich.

[73] Assignee: Bundy Corporation, Mt. Clemens, Mich.

[21] Appl. No.: 103,327

[22] Filed: Jul. 29, 1993

Related U.S. Application Data

[63] Continuation of Ser. No. 809,632, Dec. 6, 1991, abandoned.

[51] Int. Cl.$^5$ .................... F16L 35/00; F16L 55/00
[52] U.S. Cl. ........................... 285/39; 285/319; 285/331
[58] Field of Search ............ 285/39, 331, 423, 921, 285/319

[56] References Cited

U.S. PATENT DOCUMENTS

| | | |
|---|---|---|
| 793,103 | 7/1904 | Scholtz . |
| 2,366,067 | 6/1943 | Smith . |
| 3,394,954 | 5/1966 | Sarns . |
| 3,588,149 | 6/1971 | Demler, Sr. . |
| 3,603,621 | 9/1971 | Parsons . |
| 3,686,896 | 8/1972 | Rutter . |
| 3,990,727 | 11/1976 | Gallagher . |
| 4,068,870 | 1/1978 | Whitney et al. . |
| 4,123,091 | 10/1978 | Cosentino et al. . |
| 4,214,586 | 7/1980 | Mericle . |
| 4,487,437 | 12/1984 | Dickirson . |
| 4,538,836 | 9/1985 | Krutten . |
| 4,673,200 | 6/1987 | Miyauchi . |
| 4,700,926 | 10/1987 | Hansen . |
| 4,793,639 | 12/1988 | Glover et al. . |
| 4,834,423 | 5/1989 | DeLand ........................ 285/39 |
| 4,844,512 | 7/1989 | Gahwiler . |
| 4,948,175 | 8/1990 | Bartholmew ............... 285/319 X |
| 5,104,157 | 4/1992 | Bahner ........................ 285/331 |

FOREIGN PATENT DOCUMENTS

| | | |
|---|---|---|
| 541943 | 8/1983 | Australia . |
| 1164335 | 9/1969 | France . |

*Primary Examiner*—Neill R. Wilson
*Attorney, Agent, or Firm*—Dorn, McEachran, Jambor & Keating

[57] ABSTRACT

An improved fluid connector has a deformable axially outer ring with latches which retain a tube within a main body of the connection. The outer ring is oval in cross-section, with the latches extending along surfaces spaced across the minor diameter of the oval. Connection portions connect the outer ring to a main body of the connector. The connection portions extend from locations spaced across the major diameter of the oval shape. An upset portion of the tube deforms the latches radially outwardly upon insertion. A removal force may be directed radially inwardly of the outer ring at locations adjacent to the connection portions to cause the latches to bow radially outwardly and allow the tube to be removed from the connector. The inventive connector bears the removal force on the relatively thicker connecting portions, and requires flexing in the relatively thinner outer ring.

14 Claims, 1 Drawing Sheet

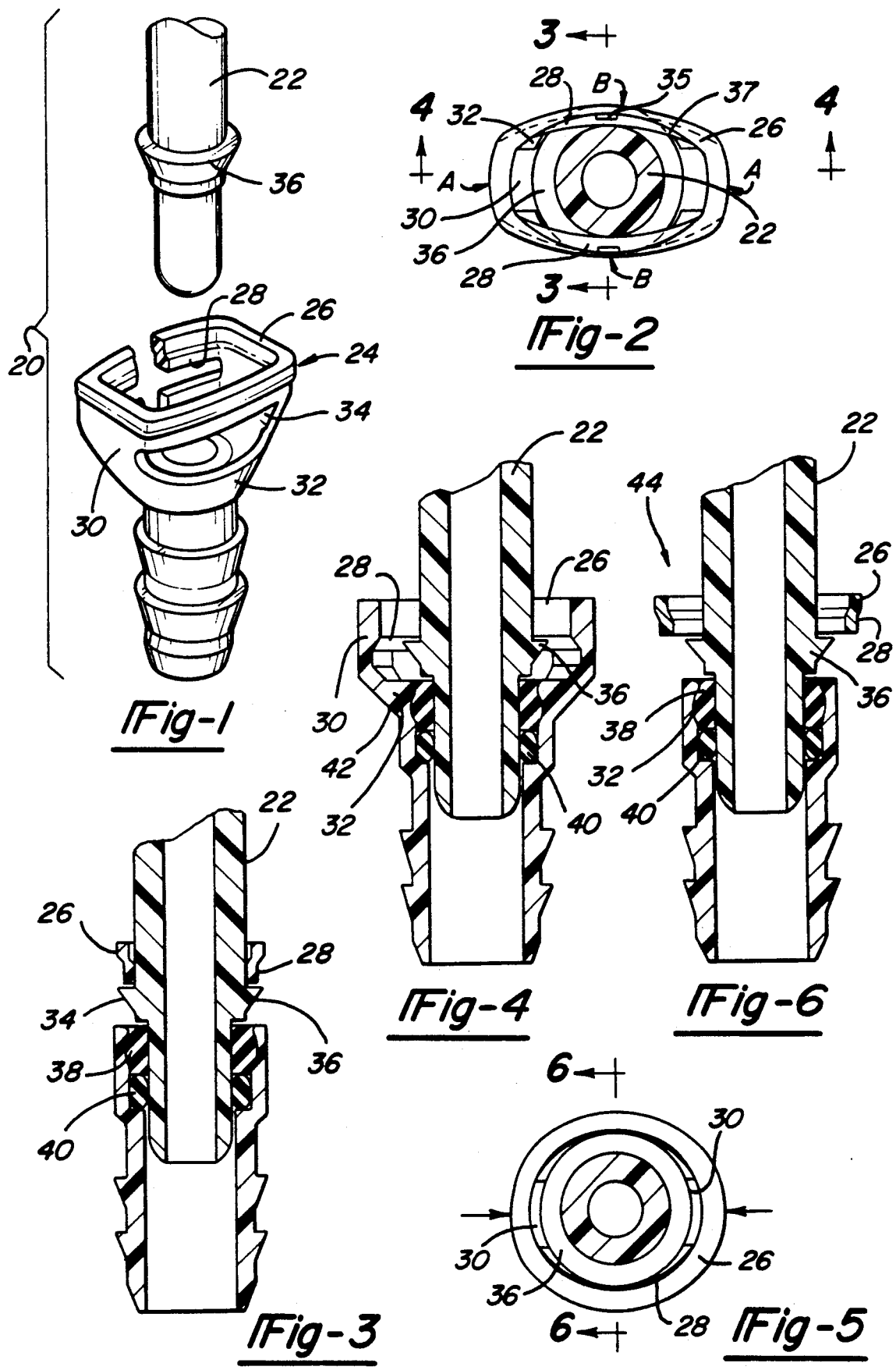

LOW PRESSURE TUBING QUICK CONNECTOR

This is a continuation of copending application Ser. No. 07/809,632 filed on Dec. 6, 1991 now abandoned.

BACKGROUND OF THE INVENTION

This invention relates to a low pressure tubing quick connector which may be manually moved to allow removal of a tube from the connector.

Several quick connectors which can be manually moved to allow removal of a tube from a housing are known. These connectors are often used in low pressure lines, such as a vapor line. In general, this type of connector has an outer ring spaced from a main housing body by a small distance, and latches extending radially inwardly from the outer ring. The latches abut an enlarged, or upset portion of a tube to retain the tube within the main body. Connection portions extend axially from the outer ring to the main body.

In one prior art connector the latches and the connection portions are circumferentially aligned. When it is desired to remove a tube from the housing, one squeezes a location spaced 90 degrees from the latches, and the latches bow radially outwardly to a removal position. The upset portion of the tube may then pass axially outwardly of the latches. This type of connector has proven somewhat successful, however, there are deficiencies in its construction.

In particular, since the latches and connection portions are circumferentially aligned, a thin outer ring portion spaced from the latches bears the force for moving the latches to the removal position. The relatively thicker latch and connection portion must be bowed radially outwardly. This requires an undesirably great amount of force to move the latches to the removal position, and can also potentially result in the housing becoming weakened.

In a second known type of quick connector, the latches and connection portion are spaced by 90 degrees. In this connector the outer ring extends axially beyond the latches, and towards the main housing portion. The connection portions extend from the end of the outer ring a very short distance to the main body. The cross-sectional shape of the outer ring is generally cylindrical, with the latches extending along an arc centered generally about a radius from a center of the housing. With this connector, the bowing of latches radially outwardly to the removal position is not as efficient as desired since the latches must move a relatively great amount throughout their circumferential extent. Further, the relatively long outer ring must be flexed radially outwardly.

SUMMARY OF THE INVENTION

In a disclosed embodiment of the present invention, an outer ring is positioned entirely on an outer axial side of an upset portion of a tube. connection portions connect the outer ring to a main housing body, and are spaced 90 degrees from latches which extend radially inwardly from the outer ring. The latches abut an axially outer side of the upset portion of the tube, retaining the tube within the housing. In order to remove the tube from the housing, one squeezes the outer ring adjacent the connection portions. The latches bow radially outwardly and allow passage of the upset portion of the tube axially outwardly of the outer ring.

In further features of the present invention, the outer ring is generally oval in cross-section, with the latches extending along surfaces spaced across the minor diameter. The connection portions extend from surfaces spaced across the major diameter.

The latches are preferably generally linear, such that a central latch portion is closer to an axis of the outer ring than portions spaced circumferentially to either side of the central latch portion. Thus, the circumferentially outer extents of the latches must move only a relatively small radial amount compared to the central latch portion. This oval shape is more efficient than a cylindrical shape, since the minor diameter of the outer ring is bending toward a cylindrical shape, and circumferential portions of the outer ring more adjacent the connection portions must move through a relatively smaller amount than the more central portions. When a force is applied adjacent the connection rings, the central latch portions bow radially outwardly the greatest amount, while circumferentially spaced portions of the latch will move radially outwardly to a lesser extent.

Preferably, the latches are spaced axially and radially inwardly from the outer ring. In this way, they are easily movable to the release position, while at the same time firmly securing the tube within the housing.

In another feature of the present invention, the latches have an axially inwardly facing planar surface which is generally perpendicular to a central axis of the outer ring. The upset portion of the tube also has an axially outwardly facing planar surface which is generally perpendicular to the axis of the tube. These two flat planar surfaces abut to firmly secure the tube within the housing.

These and other features and objects of the present invention can be best understood from the following specification and drawings, of which the following is a brief description.

BRIEF DESCRIPTION OF THE DRAWINGS

FIG. 1 is an exploded perspective view of an inventive connector.

FIG. 2 is a cross-sectional view through a fully assembled connector.

FIG. 3 is a cross-sectional view along line 3—3 as shown in FIG. 2.

FIG. 4 is a cross-sectional view along line 4—4 as shown in FIG. 2.

FIG. 5 is a cross-sectional view along the plane shown in FIG. 2, but showing movement of the connector to a release position.

FIG. 6 is a cross-sectional view along line 6—6 as shown in FIG. 5.

DETAILED DESCRIPTION OF A PREFERRED EMBODIMENT

As shown in FIG. 1, connector assembly 20 includes a tube 22 to be received in a housing 24. Housing 24 has an axially outer ring 26 with latches 28 extending radially inwardly to secure tube 22 within housing 24. Connection portions 30 connect outer ring 26 to a main body 32. Slots 34 are formed between outer ring 26 and main body 32 and extend circumferentially between the two connection portions 30. Connection portions 30 are spaced approximately 90 degrees from the centers of latches 28. An upset portion 36 on tube 32 is captured in slots 34, and latches 28 abut an axially outwardly facing surface of upset portion 36 to prevent tube removal from housing 24.

As shown in FIG. 2, latches 28 extend radially inwardly from outer ring 26 and abut upset portion 36. Connection portions 30 are spaced by 90 degrees from centers of latches 28 and extend axially inwardly to connect outer ring 26 to main body 32.

Outer ring 26 is generally oval in cross-section, with a major diameter A—A extending between connection portions 30, and a minor diameter B—B extending between centers of latches 28. In one preferred embodiment, diameter A—A was 17.2 mms, while diameter B—B was 10.8 mms.

As further shown in FIG. 2, a central latch portion 35 is closer to a central axis of tube 22 then circumferentially spaced portions 37 of latch 28. This will provide a feature which will be explained below.

As shown in FIG. 3, tube 22 is inserted into housing 24 with upset portion 36 captured axially in slot 34 between outer ring 26 and main body 32. Latches 28 have an axially inwardly facing surface which abuts an axially outwardly facing surface of upset portion 36. The abutting surfaces of latches 28 and upset portion 36 are both planar and perpendicular to a central axis of tube 22. The abutting planar faces provide a solid connection, preventing tube removal from housing 24. A spacer 38 retains a seal 40 within main body 32 to seal the fluid connection between tube 22 and housing 24.

As shown in FIG. 4, connection portions 30 extend from outer ring 26 axially inwardly to main body portion 32. A conical inwardly extending surface 42 connects connection portion 32 to main body 32. As can be seen from FIGS. 3 and 4, the entirety of outer ring 26 is spaced axially outwardly of upset portion 36.

As shown in FIG. 5, when it is desired to remove tube 22 from housing 24, a radially inward force is applied to portions of outer ring 26 adjacent connection portions 30. As these portions of outer ring 26 are biased radially inwardly, other portions of outer ring 26, and in particular latches 28, bow radially outwardly. Thus, as outer ring 26 is bowed to the removal position, it moves from a generally oval cross-section towards a circular cross-section. As latches 28 bow radially outwardly, they eventually reach a radial position where they are radially further removed from a center of tube 22 then upset portion 36. At that time, upset portion 36 may move axially outwardly of latches 28, and tube 22 may be removed from housing 24. Once tube 22 has been removed, one releases the pressure, and outer ring 26 will regain the shape shown in FIG. 2. Upset portion 36 has a conical inwardly facing surface which bows latches 28 radially outwardly when tube 22 is inserted into housing 24.

As shown in FIG. 6, when a force is applied adjacent connection portions 30, latches 28 bow radially outwardly and allow passage of upset portion 36 axially outwardly of housing 24. Since central latch portion 35 is closer to the central axis of tube 22, it must move further radially outwardly than circumferentially outer portions 37 to allow passage of upset portion 36. Due to the shape of outer ring 26, central latch portion 35 will move further radially outwardly than circumferentially outer portion 37. This minimizes the amount of deflection necessary to allow passage of tube 22. Once central latch portion 35 has moved radially outwardly a sufficient amount to allow passage of upset portion 36, circumferentially outer portion 37 will also have moved radially outwardly a sufficient amount.

With this invention, the force which causes outer ring 26 to bow is transmitted to outer ring 26 at locations aligned with the connection portions 30. Connection portions 30 are able to bear the force and flex back to their original shape upon removal of the force. Further, the radially outward flexing is in the relatively thin outer ring 26.

Housing 24 is preferably molded from a suitable plastic material. In one embodiment, a roughened acetal was used.

A preferred embodiment of the present invention has been disclosed, however, a worker of ordinary skill in the art would recognize that certain modifications would come within the scope of this invention. For that reason, the following claims should be studied in order to determine the true scope and content of this invention.

We claim:

1. A fluid connector comprising:

a tube centered on an axis and having a first outer diameter over the majority of its axial length, and an upset portion of a greater outer diameter over an axial extent beginning at a first axial location and extending axially outwardly to a second axial location;

a housing receiving said tube, said housing having a slot for receiving said upset portion, said housing further having an outer ring axially outwardly of said slot and adjacent said second axial position, said outer ring being connected by connection portions to a main body of said housing; and said outer ring being entirely axially outwardly of said second axial position, and said outer ring having a ring portion and latch members extending radially and axially inwardly from said ring portion which abut said upset portion to retain said tube within said slot, said latch members having central portions which are spaced by 90 degrees from said connection portions.

2. A fluid connector as recited in claim 1, wherein said latch central portions are spaced from said axis of said tube by a first distance and latch circumferentially spaced portions at each side circumferentially of said latch central portions are spaced from said axis by a distance greater than said first distance.

3. A fluid connector as recited in claim 1, wherein said outer ring is generally oval in cross-section with a major diameter and a minor diameter, said major diameter being greater than said minor diameter, said latch central portions being spaced across said minor diameter, and said connection portions being extending from opposed ends of said outer ring spaced across said major diameter.

4. A fluid connector as recited in claim 1, wherein said second axial portion is at an outer end of said upset portion, which is an axially outwardly facing generally planar surface extending perpendicular to said axis, and said latch members defining an axially inwardly facing generally planar surface which is also perpendicular to said axis, such that the contact between said latch members and said upset portion is at a pair of abutting planar surfaces.

5. A fluid connector as recited in claim 1, wherein said upset portion is generally conical and has an outer diameter adjacent said first axial position which is smaller than the outer diameter adjacent said second axial position.

6. A fluid connector as recited in claim 1 wherein a seal is received within said housing and surrounds said tube to seal a fluid connection between said tube and said housing.

7. A fluid connector as recited in claim 6 wherein said seal is retained within said housing by an annular spacer.

8. A fluid connector comprising:

a tube extending along an axis and having a first diameter over the majority of its axial length and an upset portion of a greater outer diameter over a limited extent;

a housing for receiving said tube, said housing having a generally oval axially outer ring with a minor diameter and a major diameter, said major diameter being greater than said minor diameter, said minor diameter having an inner peripheral surface which is spaced from said axis by a distance less than the outer diameter of said upset portion, said major diameter having an inner peripheral surface which is of an inner diameter greater than the outer diameter of said upset portion, said outer ring having a ring portion and latch members extending radially and axially inwardly from said ring portion, said outer ring being connected to a main body by connection portions extending from locations spaced across said major diameter, slots being defined axially between said outer ring and said main body, said slots extending circumferentially between said connection portions, said upset portion being received in said slots; and said outer ring being flexible such that upon the application of a radially inward force at positions adjacent said connection portions, said latch members bow radially outwardly such that each of said latch members define an inner peripheral surface spaced from the opposed latch member a distance which is greater than the outer diameter of said upset portion, and such that said tube may pass axially said outer ring.

9. A fluid connector as recited in claim 8, wherein said latch members have a central portion spaced from said axis by a first distance and circumferentially spaced portions at each side circumferential side of said central portions which are spaced from said axis by a distance greater than said first distance.

10. A fluid connector as recited in claim 8, wherein an axially outer end of said upset portion is an axially outwardly facing generally planar surface extending perpendicular to said axis, and said latch members define an axially inwardly facing generally planar surface which is also perpendicular to said axis such that the contact between each of said latch members and said upset portion is a pair of abutting planar surfaces.

11. A fluid connector as recited in claim 8, wherein said upset portion is generally conical and has a first outer diameter at an axially outer end which is greater than the outer diameter of an axially inner end of said upset portion.

12. A fluid connector as recited in claim 8, wherein said outer ring flexes radially outwardly to allow passage of said upset portions at axial locations spaced axially outwardly of said slots.

13. A fluid connector as recited in claim 8 wherein a seal is received within said housing and surrounds said tube to seal a fluid connection between said tube and said housing.

14. A fluid connector as recited in claim 13 wherein said seal is retained within said housing by an annular spacer.

* * * * *